US011852593B2

(12) United States Patent
Cheng et al.

(10) Patent No.: US 11,852,593 B2
(45) Date of Patent: *Dec. 26, 2023

(54) BROADBAND WAFER DEFECT DETECTION

(71) Applicant: Taiwan Semiconductor Manufacturing Co., Ltd., Hsinchu (TW)

(72) Inventors: Nai-Han Cheng, Hsinchu County (TW); Hsing-Piao Hsu, Taoyuan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 20 days.

This patent is subject to a terminal disclaimer.

(21) Appl. No.: 17/370,653

(22) Filed: Jul. 8, 2021

(65) Prior Publication Data

US 2021/0333220 A1     Oct. 28, 2021

Related U.S. Application Data

(63) Continuation of application No. 15/901,806, filed on Feb. 21, 2018, now Pat. No. 11,060,980.

(Continued)

(51) Int. Cl.
*G01N 21/95* (2006.01)
*G01N 21/33* (2006.01)
*G01N 21/88* (2006.01)

(52) U.S. Cl.
CPC ......... *G01N 21/9501* (2013.01); *G01N 21/33* (2013.01); *G01N 21/9505* (2013.01);
(Continued)

(58) Field of Classification Search
CPC .... G01N 21/9505; G01N 21/88; G01N 21/94; G01N 21/9501; G01N 21/95607;
(Continued)

(56) References Cited

U.S. PATENT DOCUMENTS

| 4,681,442 A | 7/1987 | Wagner |
| 5,410,162 A | 4/1995 | Tigelaar et al. |

(Continued)

FOREIGN PATENT DOCUMENTS

| CN | 101034484 A | 9/2007 |
| CN | 104007116 A | 8/2014 |

(Continued)

OTHER PUBLICATIONS

Official Action dated Feb. 15, 2019, in corresponding Taiwan Patent Application No. 10820112010.

*Primary Examiner* — Hoa Q Pham
(74) *Attorney, Agent, or Firm* — Duane Morris LLP (57) ABSTRACT

In an embodiment, a system includes: a broadband light source; a wafer with a first side facing the broadband light source; a first light sensor configured to detect reflected light from the broadband light source emanating from the first side; a second light sensor configured to detect emergent light emanating from a second side of the wafer opposite the first side, wherein the emergent light originates from the broadband light source; and a detector module configured to analyze the reflected light and the emergent light to identify wafer defects.

20 Claims, 7 Drawing Sheets

Related U.S. Application Data (60) Provisional application No. 62/592,046, filed on Nov. 29, 2017.

(52) U.S. Cl.
CPC ............... *G01N 2021/8861* (2013.01); *G01N 2021/8887* (2013.01)

(58) Field of Classification Search
CPC ....... G01N 21/9503; G01N 2021/8845; G01N 2021/8825; G03F 7/7065; G03F 7/70616
USPC ...................... 356/237.1–237.5, 239.1–239.3
See application file for complete search history.

(56) References Cited

U.S. PATENT DOCUMENTS

| | | |
|---|---|---|
| 5,410,400 A | 4/1995 | Shishido et al. |
| 5,838,433 A | 11/1998 | Hagiwara |
| 6,064,477 A | 5/2000 | Matsumoto et al. |
| 8,204,297 B1 | 6/2012 | Xiong et al. |
| 8,902,428 B2 | 12/2014 | Schlezinger et al. |
| 11,060,980 B2* | 7/2021 | Cheng ................ G01N 21/9501 |
| 2002/0171825 A1 | 11/2002 | Krantz et al. |
| 2004/0252879 A1* | 12/2004 | Tiemeyer .............. G06T 11/206 356/237.4 |
| 2009/0033912 A1 | 2/2009 | Sasaki et al. |
| 2009/0224787 A1 | 9/2009 | Chang et al. |
| 2010/0235114 A1 | 9/2010 | Levy et al. |
| 2010/0253942 A1 | 10/2010 | Mack et al. |
| 2016/0033421 A1 | 2/2016 | Meeks et al. |
| 2017/0336330 A1 | 11/2017 | Meeks et al. |

FOREIGN PATENT DOCUMENTS

| | | | |
|---|---|---|---|
| CN | 104634793 A | | 5/2015 |
| EP | 1010965 A2 | * | 6/2000 |
| JP | S61280631 A | * | 12/1986 |
| JP | 2005308602 A | * | 11/2005 |

* cited by examiner

BROADBAND WAFER DEFECT DETECTION

CROSS-REFERENCE TO RELATED APPLICATION

This application is a continuation of U.S. patent application Ser. No. 15/901,806, filed Feb. 21, 2018, which claims priority to U.S. Provisional Patent Application No. 62/592,046, filed on Nov. 29, 2017, which is incorporated by reference herein in its entirety.

BACKGROUND

Modern assembly line manufacturing processes are typically highly automated to manipulate materials and devices and create a finished product. Quality control processes often rely on human skill, knowledge and expertise for inspection of the manufactured product both during manufacture and as a finished product.

Current assembly line processes for processing semiconductor devices employ inspection techniques that rely on separate, specialized detectors for different types of wafer defects. For example, silicon lattice damage defects (e.g., cracks) are typically detected using an x-ray sensing system and wafer surface scratches are typically detected using a wafer surface scanning system. These different sensing systems are typically not interchangeable and rely on separate types of light emitters and light sensors for defect detection. Furthermore, typical defect detection may determine only a two dimensional location of a defect along a cross section of a wafer. Such inspection techniques require large amounts of overhead and expensive hardware, but still fail to produce satisfactory results. Therefore, conventional inspection techniques are not entirely satisfactory.

BRIEF DESCRIPTION OF THE DRAWINGS

Aspects of the present disclosure can be understood from the following detailed description when read with the accompanying figures. It should be noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides various embodiments of broadband wafer defect detection for semiconductor device processing. A wafer may be any type of semiconductor device or material, such as a silicon wafer. Broadband wafer defect detection includes utilizing a broadband light source that radiates broadband light. The broadband light may reflect off of a wafer and also pass through the wafer. The broadband light reflected off the wafer (e.g., reflected light) may be detected by a reflected light detector configured to detect the reflected broadband light. The broadband light that passes through the wafer (e.g., emergent light) may be detected by an emergent light sensor configured to detect the emergent broadband light. The reflected and emergent light sensors may be configured to detect different bands of light (e.g., different wavelengths of light). Accordingly, a single broadband light source may provide at least two different wavelengths of light that interact with a wafer under investigation in different manners. For example, the reflected light sensor may be configured to detect near infrared light from about 400 nanometers (nm) to about 700 nm, or at about 500 nanometers in certain embodiments (e.g., 0.5 micrometers (um)). Also, for example, the emergent light sensor may be configured to detect infrared light from about 1000 nm to about 1400 nm, or at about 1.1 um in certain embodiments. The reflected light sensor may be configured to collect reflected light sensor data that may be utilized to detect defects, such as scratches, along a surface of a wafer. The emergent light sensor may be configured to collect emergent light sensor data that may be utilized to detect defects, such as cracks or lattice deformations, within the wafer. The distance of the defects from each sensor may also be collected to provide depth information for the defects.

A broadband wafer defect detection system may include components such as the broadband light source, wafer platform, sensors (e.g., emergent light sensor and reflected light sensor), and a detection module. The detection module may analyze the data collected by the sensors and/or control the various components in the performance of broadband wafer defect detection. As will be discussed further below, the detection module may include at least one processor and computer readable storage by which the data collected by the sensors may be analyzed and inferences made concerning wafer defects. In certain embodiments, the detection module may analyze the sensor data collected by the sensors in real time and control the sensors to gather detailed sensor data (e.g., sensor data that may require specific control of the sensors, such as by controlling the sensors to focus on a particular part of a wafer under investigation for more detailed sensor data collection. In particular embodiments, the detection module may analyze sensor data that has already been collected by the sensors, such that sensor data is not analyzed in real time as the sensors are collecting sensor data.

In various embodiments, three dimensional sensor data may be collected concerning wafer defects, such as information on a location (e.g., along x and y axes) of an internal crack (e.g., lattice deformation) or scratch on a surface of a wafer under investigation as well as the depth at which the wafer defect is present (e.g., along a z axis). For example, location information (e.g., along x and y axes) may be collected from a two dimensional image of the wafer (whether from reflected light or from emergent light). Then, depth information may be collected by depth imaging techniques, such as aperture imaging techniques, or stereo imaging techniques. Aperture imaging techniques may include adjusting a depth of field focus of a sensor to determine the distance of a defect to a sensor. For example, in performance of aperture imaging techniques, the sensor, with a particular focal length, may adjust an aperture that covers the sensor to determine which aperture size yields sensor data with aspects of the wafer defect in focus. As another example, this location and depth information may also be collected by using stereo imaging techniques, with two or more spatially separated sensors (e.g., two or more emergent light sensors and/or two or more reflected light sensors). In stereo imaging techniques, the sensor data from two or more spatially separated sensors may be compared and the depth information extracted from the differences between the sensor data from the two or more spatially separated sensors. In certain embodiments, conventional aperture imaging techniques and/or stereo imaging techniques may be utilized, but be adapted to broadband wafer defect detection. A collection of the three dimensional sensor data, along with three dimensional information concerning the orientation of defects relative to each other and relative to the wafer, may be referred to as a three dimensional map of wafer defects.

In various embodiments, the broadband light source may be any light source that produces broadband light. Broadband light may include both reflected light and emergent light. Reflected light may be any wavelength of light that may reflect off of a wafer under investigation. Emergent light may be any wavelength of light that may pass through a wafer under investigation. Stated another way, reflected light may reflect off the wafer under investigation after penetrating a wafer to a specific depth. In contrast, emergent light may pass entirely through the wafer under investigation. For example, reflected light may include near infrared light from about 400 nanometers (nm) to about 700 nm, or at about 500 nanometers in certain embodiments (e.g., 0.5 micrometers (um)). Also, emergent light may include infrared light from about 1000 nm to about 1400 nm, or at about 1.1 um in certain embodiments. In certain embodiments, the reflected light sensor may be any type of light sensor configured to detect reflected light. Also, an emergent light sensor may be any type of light sensor configured to detect emergent light. In various embodiments, a wafer stage may be any type of holder, platform, brace, or receptacle configured to orient a wafer relative to a broadband light source and sensors.

Figure 1:
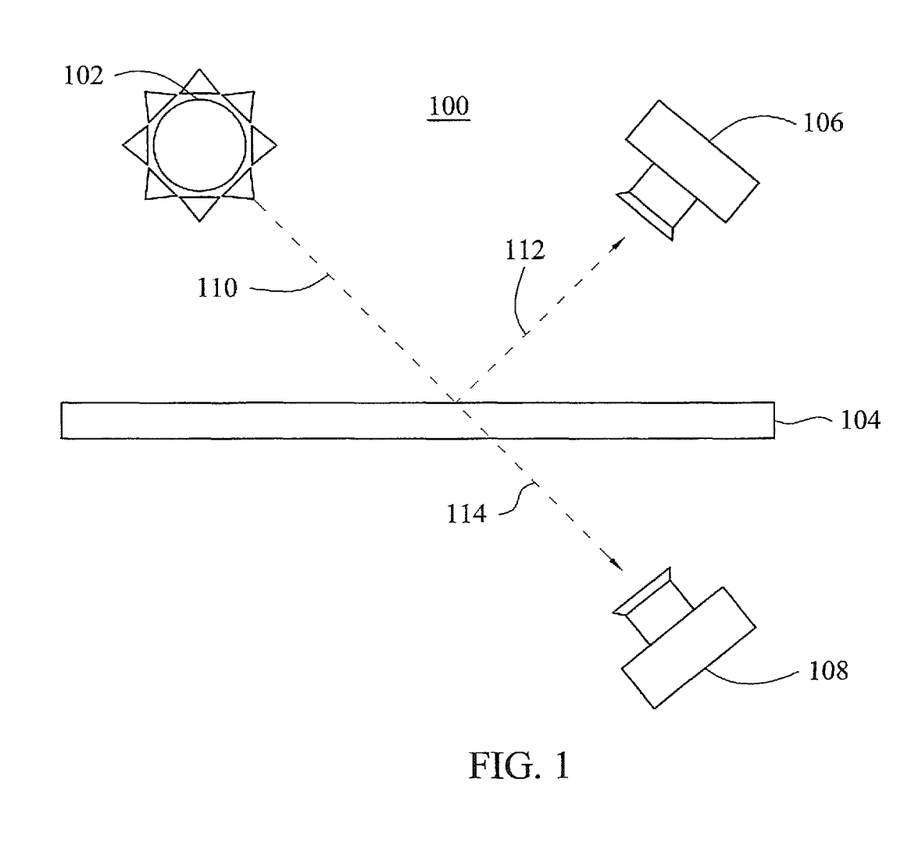
FIG. 1 is an illustration of a broadband wafer defect detection system, in accordance with some embodiments.

FIG. 1 is an illustration of broadband wafer defect detection with components of a broadband wafer detection system 100, in accordance with some embodiments. The broadband wafer detection system may include a broadband light source 102, a wafer 104 under investigation, a reflected light sensor 106, and an emergent light sensor 108. Although not specifically illustrated relative to each of these illustrated components of the broadband wafer detection system, the broadband wafer detection system may also include a detector module as discussed further below in connection with FIG. 3. Each of the illustrated reflected light sensor 106 and emergent light sensor 108 may represent at least one reflected light sensor 106 and/or at least one emergent light sensor 108 that may be utilized as desired for different applications in various embodiments. For example, at least two reflected light sensors 106 and at least two emergent light sensors 108 may be utilized to perform stereo imaging techniques, as introduced above.

The broadband light source may produce broadband light radiation 110. Part of the broadband light radiation 110 may reflect off of the wafer 104 and be detected as reflected light 112 by the reflected light sensor 106. Also, part of the broadband light radiation 110 may pass through the wafer 104 and be detected as emergent light 114 by the emergent light sensor 108. For simplicity of illustration, light radiation is shown as light rays 110, 112, and 114. Furthermore, for simplicity of illustration, refraction of the light rays 110, 112, and 114 is not specifically illustrated as the light radiation passes through different mediums (e.g., into the wafer 104 or out of the wafer 104).

Figure 2A:
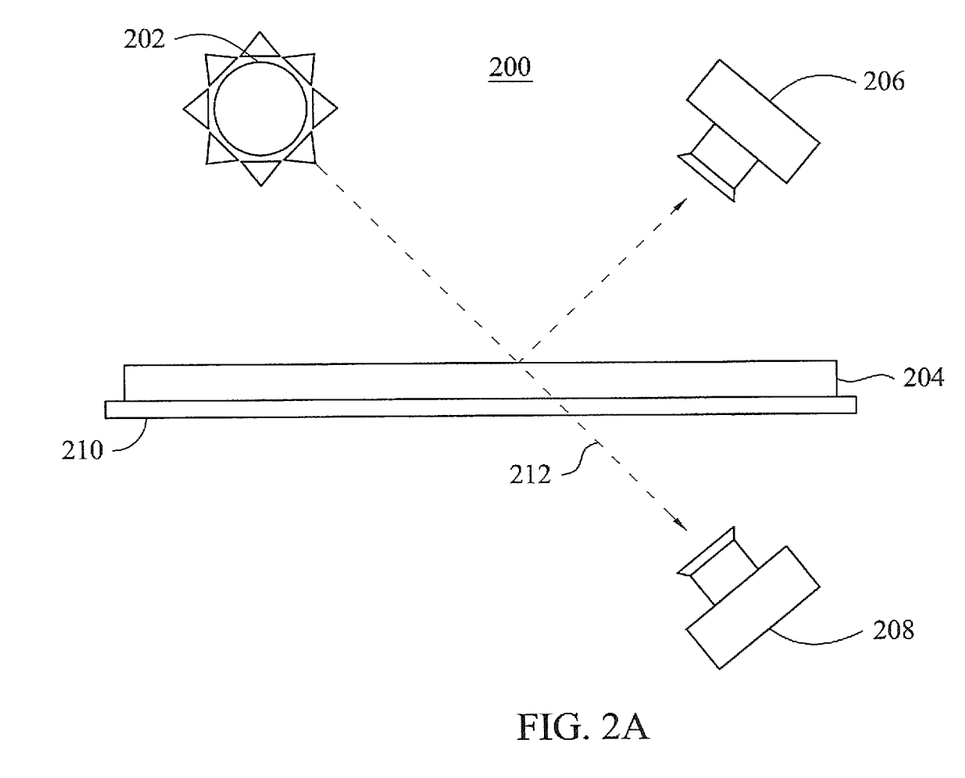
FIG. 2A is an illustration of a broadband wafer defect detection system on a wafer platform, in accordance with some embodiments.

FIG. 2A illustrates components of a broadband wafer defect detection system 200 with a wafer platform, in accordance with some embodiments. As introduced above, the wafer platform may be a type of wafer stage on which a wafer may rest or otherwise be secured during broadband wafer defect detection. The broadband wafer detection system may include a broadband light source 202, a wafer 204 under investigation, a reflected light sensor 206, and an emergent light sensor 208. The wafer 204 may be supported on a wafer platform 210. The wafer platform 210 may be made of a transparent material that allows for emergent light 212 that passes through the wafer 206 to also pass through the wafer platform. Accordingly, the emergent light sensor 208 may detect the emergent light 212 that passes through both the wafer 206 and the wafer platform 210. Furthermore, the wafer platform 210 may be controlled relative to the broadband light 202 source or the sensors 204, 208. For example, the wafer platform 210 may be configured to rotate while the broadband light source 202 or the sensors 206, 208 are still.

Figure 2B:
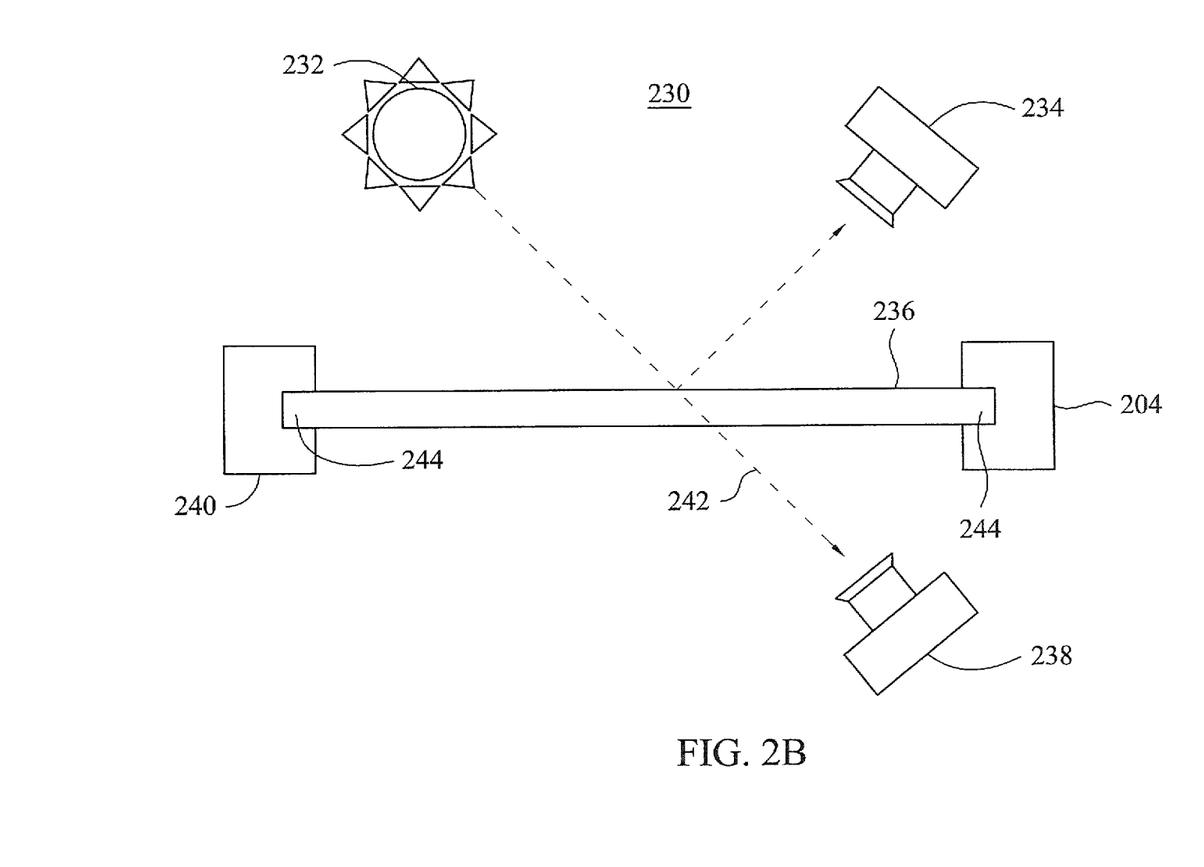
FIG. 2B is an illustration of a broadband wafer defect detection system with a wafer brace, in accordance with some embodiments.

FIG. 2B illustrates components of a broadband wafer defect detection system 230 with a wafer brace, in accordance with some embodiments. The broadband wafer detection system 230 may include a broadband light source 232, a wafer 234 under investigation, a reflected light sensor 236, and a emergent light sensor 238. The wafer 234 may be held by the wafer brace 240. The wafer brace 240 may be a wafer stage for which emergent light 242 does not need to pass through to reach the emergent light sensor. For example, the wafer brace 240 may secure the wafer 236 by clamping an extremity 244 of the wafer (e.g., around an extreme side of the wafer, such as around the outer edges of a rounded wafer). In certain embodiments, the wafer brace 240 may only secure the wafer 236 by clamping at certain locations of the wafer, as opposed to around all of the outer edges of a rounded wafer. Accordingly, the emergent light sensor 238 may detect the emergent light 242 that passes through the wafer 236 without interference from the wafer brace 240. Furthermore, the wafer brace 240 may be controlled relative to the broadband light 232 source or the sensors 234, 238. For example, the wafer brace 240 may be configured to rotate the wafer 236 while the broadband light source 232 or the sensors 234, 238 are still.

Figure 2C:
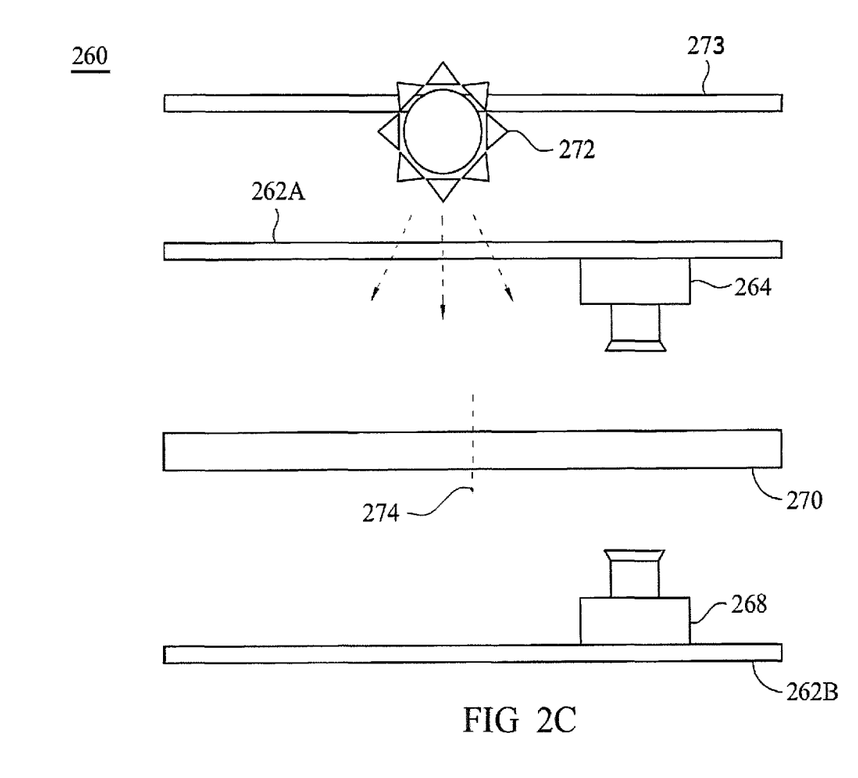
FIG. 2C is an illustration of a broadband wafer defect detection system with a motion control system for sensors, in accordance with some embodiments.

FIG. 2C is an illustration of a broadband wafer defect detection system 260 with a motion control system for sensors and/or for a broadband light source, in accordance with some embodiments. The motion control system for sensors and/or a broadband light source may move a sensor and/or a broadband light source relative to other components of a broadband wafer detection system. For example, sensor rails 262A, 262B may move at least one reflected light sensor 264 and/or at least one emergent light sensor 268. This motion control system may move each sensor 264, 268 relative to at least one of the wafer 270, another sensor 264, 268, and/or the broadband light source 272. For example, the emergent light sensor 268 may be moved relative to at least one of the wafer 270, the reflected light sensor 264, and/or the broadband light source 272. Similarly, the reflected light sensor 268 may be moved relative to at least one of the wafer 270, the emergent light sensor 267, and the broadband light source 272. Also, in certain embodiments, the broadband light source 272 may be controlled by a motion control system (e.g., rail 276). Accordingly, the broadband light source may be moved relative to at least one of the wafer 270, the emergent light sensor 264, and the reflected light sensor 268. In particular embodiments, the wafer may be moved by rotating the wafer 270 around a central axis 274 through the center of the wafer while the motion control system may control a sensor 264, 268 and/or the broadband light source 273. For example, the wafer 270 may be rotated while moving the sensor 264, 268 along the rail 262A 262B or while moving the broadband light source 272 along the rail 272.

Figure 3:
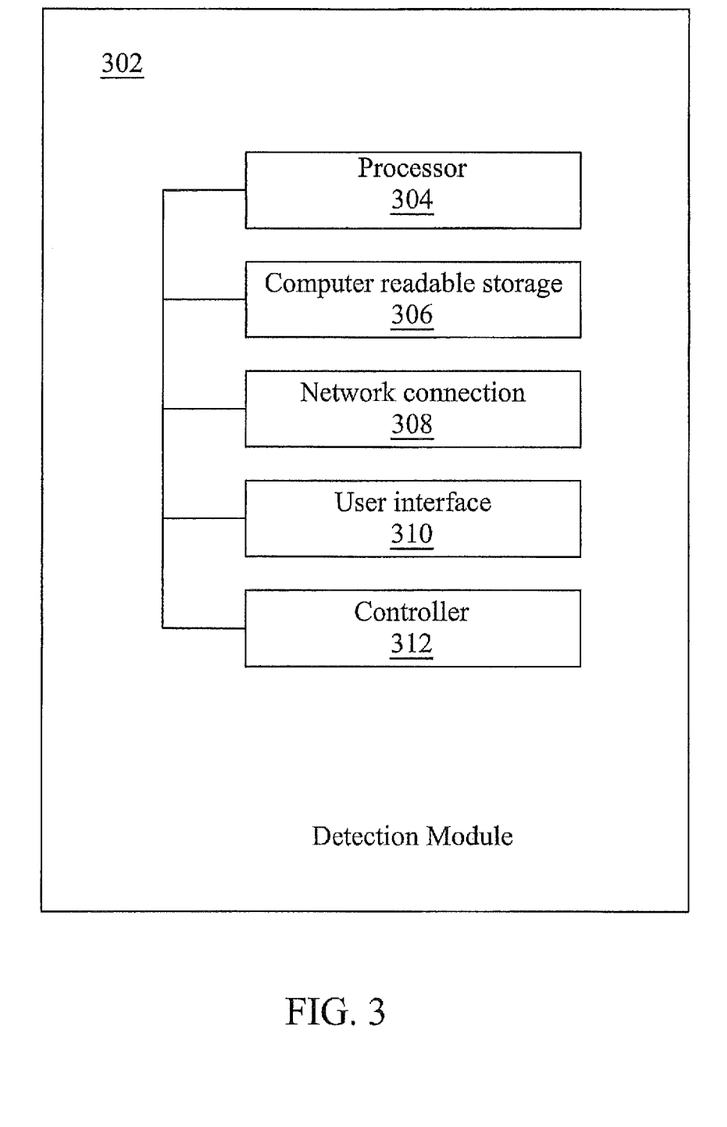
FIG. 3 is a block diagram of various functional modules of a broadband wafer defect detection system, in accordance with some embodiment.

FIG. 3 is a block diagram of various functional modules of a detection module 302, in accordance with some embodiment. The detection module 302 may include a processor 304. In further embodiments, the processor 304 may be implemented as one or more processors.

The processor 304 may be operatively connected to a computer readable storage module 306 (e.g., a memory and/or data store), a network connection module 308, a user interface module 310, a controller module 312, and a sensor module 314. In some embodiments, the computer readable storage module 306 may include broadband wafer defect detection logic that may configure the processor 304 to perform the various processes discussed herein. The computer readable storage may also store data, such as data collected by the sensors (e.g., by at least one emergent light sensor and/or at least one reflected light sensor), defect information (e.g., location of defects, number of defects of a particular wafer, and/or a three dimensional map of wafer defects), identifiers for a defect, identifiers for a type of defect, identifiers for a semiconductor stage, identifiers for a broadband light source, identifiers for a sensor, and any other parameter or information that may be utilized to perform the various processes discussed herein.

The network connection module 308 may facilitate a network connection of the broadband wafer defect detection system with other devices that may communicate within or external to the detection module 302. In certain embodiments, the network connection module 306 may facilitate a physical connection, such as a line or a bus. In other embodiments, the network connection module 306 may facilitate a wireless connection, such as over a wireless local area network (WLAN) by using a transmitter, receiver, and/or transceiver.

The detection module 302 may also include the user interface module 310. The user interface may include any type of interface for input and/or output to an operator of the broadband wafer defect detection system, including, but not limited to, a monitor, a laptop computer, a tablet, or a mobile device, etc.

The detection module 302 may include a controller module 312. The controller module 312 may be configured to control various physical apparatuses that control movement of a sensor, broadband light source and/or a wafer platform, as discussed above. For example, the controller module 312 may control a motion control system by controlling a motor that may move at least one of a sensor, wafer platform, or a broadband light source of the broadband wafer defect detection system. The controller may be controlled by the processor and may carry out the various aspects of the broadband wafer defect detection process, as will be discussed further below.

Figure 4:
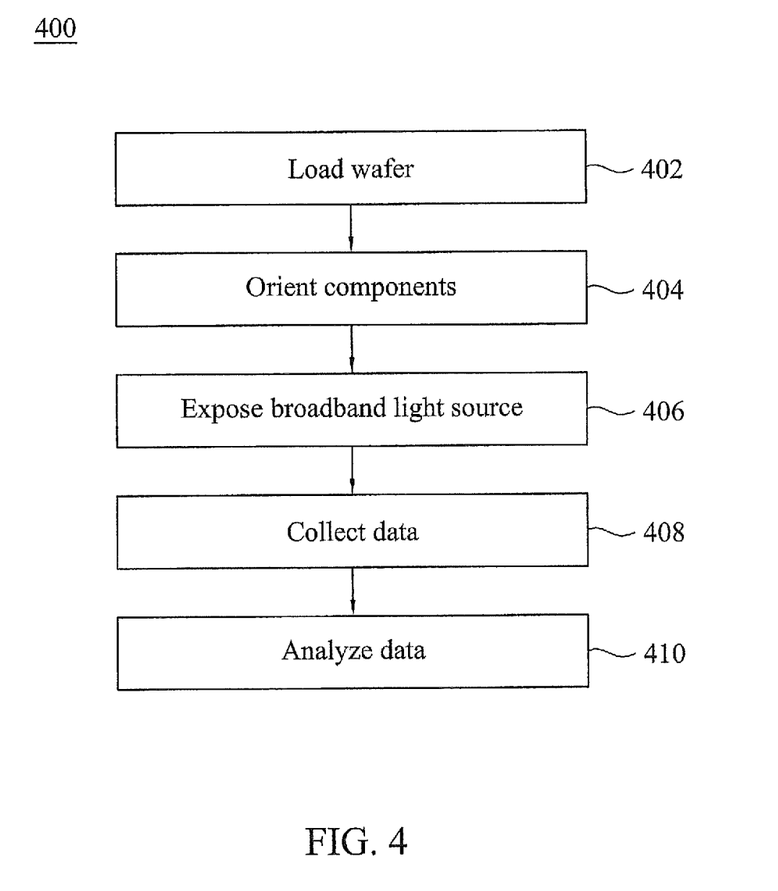
FIG. 4 is a flow chart of a broadband wafer defect detection process, in accordance with some embodiments.

FIG. 4 is a flow chart of a broadband wafer defect detection process, in accordance with some embodiments. The broadband wafer defect detection process may be performed by a broadband wafer defect detection system, discussed above. It is noted that the process 400 is merely an example, and is not intended to limit the present disclosure. Accordingly, it is understood that additional operations may be provided before, during, and after the process 400 of FIG. 4, certain operations may be omitted, certain operations may be performed concurrently with other operations, and that some other operations may only be briefly described herein.

At operation 402, a wafer may be loaded on a wafer stage within the broadband wafer defect detection system. The wafer may be any type of semiconductor device, such as a silicon wafer, for which broadband wafer defect detection may be performed. The wafer may be made of a material from which both emergent light and reflected light may be detected by sensors.

At operation 404, the various components of a broadband wafer defect detection system may be oriented for broadband wafer defect detection. For example, a broadband light source, at least one emergent light sensor, at least one reflected light sensor, and the wafer may be oriented relative to each other to perform broadband wafer defect detection. For example, the wafer may be oriented relative to the other components of the broadband wafer defect detection system such that each of the sensors may capture sensor data that may characterize at least one wafer defect in the wafer. Optionally, in certain embodiments, components of a broadband wafer defect detection system may be reoriented after an initial collection of sensor data so that more focused sensor data may be collected (e.g., sensor data that focuses on a particular region of a wafer).

At operation 406, the broadband light source may be exposed in the system. In certain embodiments, the broadband light source may be exposed before block 404 (e.g., orientation of the broadband wafer defect detection system components). The broadband light source may emit broadband light that includes both reflected light and emergent light. As discussed above, the broadband light reflected off the wafer (e.g., reflected light) may be detected by a reflected light detector configured to detect the reflected broadband light. The broadband light that passes through the wafer (e.g., emergent light) may be detected by an emergent light sensor configured to detect the emergent broadband light. The reflected and emergent light may be different bands of light (e.g., different wavelengths of light) that interact with a wafer in different ways. For example, the reflected light may be near infrared light from about 400 nanometers (nm) to about 700 nm, or at about 500 nanometers in certain embodiments (e.g., 0.5 micrometers (um)). Also, for example, the emergent light may be infrared light from about 1000 nm to about 1400 nm, or at about 1.1 um in certain embodiments. Although a single broadband light source is discussed above, multiple broadband light sources may be utilized as desired for different applications in various embodiments. For example, on certain embodiments, more than one broadband light source may be utilized, such as for even illumination of a wafer. In further embodiments, a broadband light source may include multiple light sources whose combination includes both reflected light and emergent light, such as a reflected light source and an emergent light source within a same housing, or that radiate from a same location.

At operation 408, sensor data may be collected by the various reflected and emergent light sensors. As discussed above, there may be at least one reflected light sensor and at least one emergent light sensor used for a broadband wafer defect detection system. Sensor data may be collected from a reflected light sensor from the radiated broadband light that reflects off of the wafer under investigation. Also, sensor data may be collected from an emergent light sensor from radiated broadband light that passes through the wafer under investigation. The sensors may be configured to produce image data within the wavelength spectrum of emergent light and/or broadband light. For example, the sensors may be configured to produce an image, or a series of images (e.g., a video), which may be analyzed subsequently or in real time to identify a crack in the wafer or a scratch on the wafer.

As introduced above, three dimensional sensor data may be collected concerning wafer defects, such as information on a location (e.g., along x and y axes) of an internal crack (e.g., lattice deformation) or scratch on a surface of a wafer under investigation as well as the depth at which the wafer defect is present (e.g., along a z axis). For example, location information (e.g., along x and y axes) may be collected from a two dimensional image of the wafer (whether from reflected light or from emergent light). Then, depth information may be collected by depth imaging techniques, such as aperture imaging techniques, or stereo imaging techniques. Aperture imaging techniques may include adjusting a depth of field of a sensor to determine the distance of a defect the sensor. For example, in performance of aperture imaging techniques, the sensor (with a particular focal length) may adjust an aperture that covers the sensor to determine which aperture size yields sensor data with aspects of the wafer defect in focus. As another example, this location and depth information may also be collected by using stereo imaging techniques, with two or more spatially separated sensors (e.g., two or more emergent light sensors and/or two or more reflected light sensors). In stereo imaging techniques, the sensor data from two or more spatially separated sensors may be compared and the depth information extracted from the differences between the sensor data from the two or more spatially separated sensors. In certain embodiments, conventional aperture imaging techniques and/or stereo imaging techniques may be utilized, but be adapted to broadband wafer defect detection.

In certain embodiments, sensor data may be collected from a scan of the wafer under investigation, such as by collecting an image along a surface of a wafer and collecting information at different distances away from a respective sensor. Then, the image data at different distances may be compiled as three dimensional sensor data (e.g., a three dimensional map of wafer defects).

At operation 410, sensor data collected by the various sensors may be analyzed for wafer defects. In certain embodiments, both operation 408 and 410 may be a single operation in which sensor data may be analyzed and then further sensor data collected in accordance with the analysis (e.g., by collecting focused or higher resolution image data for a particular area of the wafer based on analysis of the wafer).

In certain embodiments, a wafer defect may be detected as a unexpected (e.g., not within an acceptable variance) non-uniformity along the surface of the wafer under investigation or within the wafer under investigation. For example, a non-uniformity within the lattice structure wholly internal to a wafer may be determined to be a wafer defect that is a crack. Also, a non-uniformity along the surface of a wafer (e.g., exposed from the surface of the wafer) may be determined to be a wafer defect that is a scratch. In certain embodiments, a wafer defect may be determined by thresholding, such as by determining that the amount of non-uniformity along a wafer surface or internal lattice structure exceeds a threshold (e.g., is greater than or less than a threshold value). In certain embodiments, the threshold value may represent a value of non-uniformity that is more significant than an average or acceptable amount of non-uniformity along a wafer surface or internal lattice structure. In particular embodiments, the threshold value may represent a value of non-uniformity that rises to a level of significance that may affect further semiconductor processing performed to the wafer (e.g., a crack of a significant size within a wafer that may, more likely than not, cause the wafer to fracture during semiconductor processing).

Figure 5:
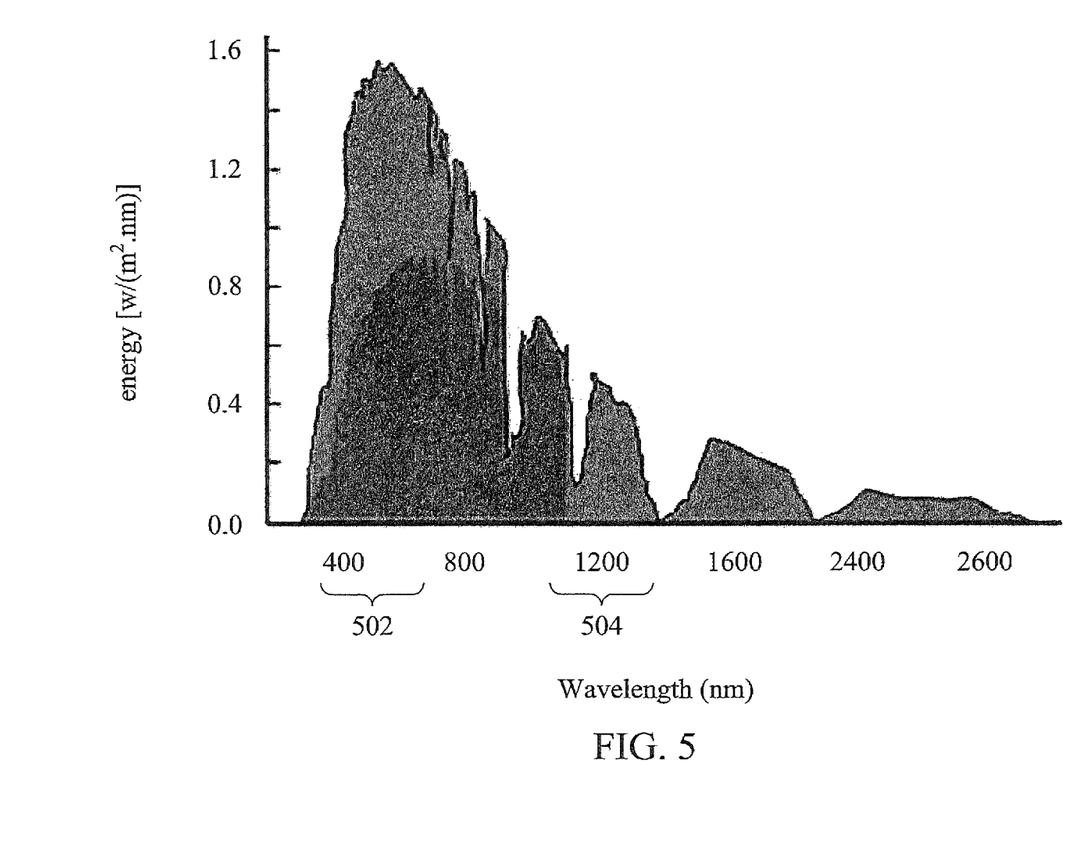
FIG. 5 illustrates aspects of reflection light wavelengths and emergent light wavelengths along a plot of energy versus wavelength, in accordance with some embodiments.

FIG. 5 illustrates aspects of reflection wavelengths and emergent wavelengths along a plot of energy versus wavelength, in accordance with some embodiments. The plot may be a plot of a broadband light from a broadband light source from about a 300 nm wavelength to about a 2500 nm wavelength. The portion of the broadband light that is reflected light 502 may be infrared light from about 400 nanometers (nm) to about 700 nm, or at about 500 nanometers in certain embodiments (e.g., 0.5 micrometers (um)). The portion of the broadband light that is emergent light 504 may be from about 1000 nm to about 1400 nm, or at about 1.1 um in certain embodiments.

In an embodiment, a system includes: a broadband light source; a wafer with a first side facing the broadband light source; a first light sensor configured to detect reflected light from the broadband light source emanating from the first side; a second light sensor configured to detect emergent light emanating from a second side of the wafer opposite the first side, wherein the emergent light originates from the broadband light source; and a detector module configured to analyze the reflected light and the emergent light to identify wafer defects.

In another embodiment, a system includes: a broadband light source; a wafer with a first side facing the broadband light source; a first light sensor configured to detect reflected light from the broadband light source emanating from the first side; a second light sensor configured to detect emergent light emanating from a second side of the wafer opposite the first side, wherein the emergent light originates from the broadband light source; and a detector module configured to generate a three dimensional map of wafer defects based on the reflected light and the emergent light.

In another embodiment, a method includes: radiating a broadband light onto a first surface of the wafer; collecting first light sensor data from reflected light off of the first surface; collecting second light sensor data from emergent light emerging from a second surface of the wafer opposite the first surface of the wafer; detecting wafer defects based on the reflected light and the emergent light.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
a single broadband light source configured to provide at least two different wavelengths of light;
a wafer brace configured to hold a wafer along one or more edge portions of the wafer such that the wafer has a first side facing the single broadband light source;
a first light sensor configured to detect reflected light from the single broadband light source emanating from the first side, wherein the reflected light has a first wavelength;
a second light sensor configured to detect emergent light emanating from a second side of the wafer opposite the first side, wherein the emergent light detected by the second light sensor and the reflected light detected by the first light sensor are of different wavelengths, and wherein the emergent light originates from the single broadband light source and has a second wavelength different from the first wavelength;
a first sensor rail configured to movably hold the first light sensor such that the first light sensor moves along the first sensor rail relative to the single broadband light source;
a second sensor rail configured to movably hold the second light sensor such that the second light sensor moves along the second sensor rail relative to the single broadband light source; and
a light source rail configured to movably hold the single broadband light source such that the single broadband light source moves along the light source rail relative to the first sensor, wherein the first sensor rail is located at a first horizontal level, and the light source rail is located at a second horizontal level, wherein the first horizontal level and the second horizontal level are different.

2. The system of claim 1, further comprising a detector configured to detect an internal crack within the wafer based on the emergent light.

3. The system of claim 2, wherein the detector is configured to determine a depth of the internal crack.

4. The system of claim 3, wherein the detector is configured to determine the depth of the internal crack based on a focal length associated with the internal crack.

5. The system of claim 2, wherein the detector is configured to detect a scratch along the first side based on the reflected light.

6. The system of claim 5, wherein the detector is configured to determine a location of the scratch along the first side.

7. The system of claim 6, wherein the detector is configured to determine the location of the scratch based on a focal length associated with the scratch.

8. The system of claim 1, wherein the wafer comprises silicon.

9. The system of claim 1, wherein the reflected light has a wavelength of substantially 0.5 micrometers.

10. The system of claim 1, wherein the emergent light has a wavelength of substantially 1.1 micrometers.

11. A system, comprising:
a single broadband light source configured to provide at least two different wavelengths of light;
a wafer with a first side facing the single broadband light source;
a first light sensor configured to detect reflected light from the single broadband light source emanating from the first side, wherein the reflected light has a first wavelength;
a second light sensor configured to detect emergent light emanating from a second side of the wafer opposite the first side, wherein the emergent light detected by the second light sensor and the reflected light detected by the first light sensor are of different wavelengths, and wherein the emergent light originates from the single broadband light source and has a second wavelength different from the first wavelength;
a wafer brace configured to secure at least one extremity of the wafer, wherein the emergent light passes through only the wafer to be received by the second light sensor;

a first sensor rail configured to movably hold the first light sensor such that the first light sensor moves along the first sensor rail relative to the single broadband light source;

a second sensor rail configured to movably hold the second light sensor such that the second light sensor moves along the second sensor rail relative to the single broadband light source; and a light source rail configured to movably hold the single broadband light source such that the single broadband light source moves along the light source rail relative to the first sensor, wherein the first sensor rail is located at a first horizontal level, and the light source rail is located at a second horizontal level, wherein the first horizontal level and the second horizontal level are different.

12. The system of claim 11, further comprising:
a light source controller configured to move the single broadband light source relative to the wafer and the first and second light sensors.

13. The system of claim 11, further comprising:
a wafer platform controller configured to move the wafer relative to the single broadband light source and the first and second light sensors.

14. The system of claim 11, further comprising:
a first and second light sensor controller configured to move the first and second light sensors relative to the single broadband light source and the wafer.

15. The system of claim 11, further comprising:
a first light sensor controller configured to move the first light sensor relative to the second light sensor.

16. A method, comprising:
radiating a broadband light from a single broadband light source onto a first surface of a wafer, wherein the broadband light provides at least two different wavelengths of light;

collecting first light sensor data from reflected light off of the first surface, wherein the first light sensor data is collected by a first light sensor, and wherein the reflected light originates from a single broadband light source and has a first wavelength;

collecting second light sensor data from emergent light emerging from a second surface of the wafer opposite the first surface of the wafer, wherein the second light sensor data is collected by a second light sensor different from the first light sensor, and wherein the emergent light associated with the second light sensor data and the reflected light associated with the first light sensor data are of different wavelengths, and wherein the emergent light originates from the single broadband light source and has a second wavelength different from the first wavelength;

moving the first light sensor on a first rail relative to the single broadband light source; and moving the second light sensor on a second rail relative to the single broadband light source, wherein the single broadband light source is on a light source rail configured to movably hold the single broadband light source such that the single broadband light source moves along the light source rail relative to the first sensor, wherein the first rail is located at a first horizontal level, and the light source rail is located at a second horizontal level, wherein the first horizontal level and the second horizontal level are different.

17. The method of claim 16, further comprising:
detecting an internal crack within the wafer based on the emergent light.

18. The method of claim 17, further comprising:
determining a depth of the internal crack based on a focal length associated with the internal crack.

19. The method of claim 16, further comprising:
detecting a scratch along the first side based on the reflected light.

20. The method of claim 19, further comprising:
determining a location of the scratch along the first side based on a focal length associated with the scratch.

* * * * *